2,769,777

INITIATION OF PHOTOPOLYMERIZATION

Gail H. Birum and Roland J. Kern, Dayton, Ohio, assignors to Monsanto Chemical Company, St. Louis, Mo., a corporation of Delaware No Drawing. Application January 4, 1954,
Serial No. 402,153

17 Claims. (Cl. 204—158)

This invention relates to photopolymerization of unsaturated organic compounds. In specific aspects the invention pertains to new photosensitizers for the photopolymerization of acrylonitrile, vinyl acetate, styrene and the lower alkyl acrylates and methacrylates.

The essence of this invention resides in the use of organic sulfenates as sensitizers for photopolymerization. Organic sulfenates contain the radical —O—S— wherein each of the indicated valences is attached to carbon. In accordance with preferred aspects one or more of the monomers acrylonitrile, vinyl acetate, styrene, and the lower alkyl acrylates and methacrylates, is subjected to the polymerizing influence of light in the ultraviolet range while having dispersed in said monomer a small amount of a sulfenate effective to photosensitize, i. e., speed up, the polymerization. The sulfenates employed according to the invention act to increase the rate of polymerization occurring under the influence of light in the ultraviolet range, and can be termed photosensitizers or photopolymerization catalysts. Preferably light containing effective amounts of light having wave lengths of 2,000 to 4,000 Angstrom (A.) units is used.

The present invention in its broadest aspects includes the use of any sulfenate effective to increase the rate of photopolymerization of a monomer. Sulfenates can be designated by the general formula

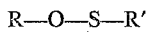

wherein R and R' are organic radicals, with attachment of —O—S— being to carbon atoms. In other words, the oxygen of the sulfenate radical is attached to a carbon atom of the R group, and the sulfur of the sulfenate radical is attached to a carbon atom of the R' group. Each of R and R' can be aliphatic, alicyclic, aryl or heterocyclic, or can contain combinations of such groups. While there is no particular limit on molecular weight of the sulfenates, those in which neither R nor R' contains more than about 12 carbon atoms are generally most convenient and useful. In a given sulfenate molecule, both R and R' can be identical radicals, or R and R' can be different radicals. Both R and R' can be solely hydrocarbon, or they both can be substituted with non-interfering radicals, i. e., radicals which do not prevent the desired initiation of photopolymerization. Among radicals that are usually non-interfering can be mentioned by way of example: halogen, alkoxy, aryloxy, cyano, mercapto(—SH), sulfide(—SR), acetyl. R and R' can be alkyl groups or alkyl groups substituted as indicated above. R and R' can be alkenyl groups, and such alkenyl groups can be substituted similarly. R and R' can be alicyclic, especially cycloparaffinic and cyclo-olefinic, either unsubstituted or substituted similarly to the alkyl and alkenyl as described above. The alkyl or alkenyl groups can be straight-chain or of any of the various branched-chain configurations. R and R' can be aryl groups, i. e., groups in which either the oxygen or sulfur of the sulfenate radical is attached to an aryl nucleus, e. g., a benzene, naphthalene, etc. nucleus. Such nuclei can also be substituted as indicated hereinabove. When aryl nuclei are substituted with alkyl groups, the aryl groups are commonly called alkaryl. By the same token, when an alkyl group is substituted with an aryl group, the entire R or R' is called aralkyl but can be considered a specific type of substituted alkyl radical. Various other combinations of different types of groups of course are also within the scope of R and R', for example alkylcycloalkyl, cycloalkylaryl, aralkenyl, etc. Such mixed groups are generally designated as belonging to the broad groupings aliphatic, alicyclic, aromatic or heterocyclic in accordance with the character of that portion of the group which is attached to the sulfenate radical. Either or both R and R' can constitute non-interfering heterocyclic nuclei, e. g., furane, etc., said nuclei being unsubstituted or substituted with hydrocarbon or non-interfering hydrocarbon radicals as aforesaid. Moreover, such heterocyclic nuclei can themselves be substituents on alkyl, aryl, etc. radicals, the entire substituted radical being R or R'.

By way of example, but not of limitation, suitable radicals constituting R and R', can be mentioned: methyl, ethyl, n-propyl, isopropyl, n-butyl, isobutyl, tert.-butyl, dodecyl, propenyl, trichloromethyl, phenyl, benzyl, parachlorophenyl, trichlorophenyl, m-methoxyphenyl, cyclohexyl, 3-acetylcyclohexyl, ethylcyclohexyl, dimethylcyclopentyl, cyclohexylphenyl, biphenyl, naphthyl, β-chloronaphthyl. Further, by way of example, and not of limitation, specific compounds suitable in the practice of the invention may be mentioned: p-chlorophenyl p-chlorobenzenesulfenate (an example in which both R and R' are the same radical), 2,4,5-trichlorophenyl trichloromethanesulfenate, ethyl trichloromethanesulfenate, allyl trichloromethanesulfenate, ethyl 2-benzothiazylsulfenate, methyl chloromethanesulfenate, methyl methanesulfenate, phenyl methanesulfenate, methyl benzenesulfenate, ethyl 2 - chloroethanesulfenate, tert.-butyl chloromethanesulfenate, ethyl tert.-butanesulfenate, phenyl tert.-butanesulfenate, p - methylphenyl p - methylbenzenesulfenate. Compounds which are generally preferred are those in which at least one of R and R' is aryl (including substituted aryl). Those in which both R and R' are aryl constitute a preferred sub-class. Other sub-classes are those wherein both R and R' are alkyl, and those wherein one of R and R' is alkyl and the other is aryl. Sulfenates in which both R and R' are solely hydrocarbon are useful in the practice of the invention. So also are those wherein either or both R and R' are chlorine-substituted hydrocarbon radicals. It is also preferred that neither R nor R' contain more than one halogen atom, as those compounds wherein either R or R' contains in excess one halogen atom are excellent photosensitizers but tend to give a product of poor thermal stability.

The quantity of sulfenate to be used as photosensitizer will of course be dependent upon many variables including the particular sulfenate, the wave length of ultraviolet light employed, the time of irradiation, the monomer or monomers present, and the temperature. In any event, the amount of sulfenate photosensitizer is small, but sufficient is employed to be effective as a photosensitizer. This small but catalytic amount is usually within the range of from 0.01 to 5 weight percent based upon the amount of monomeric material initially present. It will seldom be necessary to employ more than 1 or 2 weight percent of the added photosensitizer, and no more than 0.1 weight percent is in most instances sufficient to obtain a good polymerization rate.

It is interesting to note that the sulfenates, in addition to their photosensitizing properties, act as modifying agents, i. e., they control the molecular weight of the polymer produced. Thus, the molecular weight of polymer made by photopolymerization with the aid of a sulfenate is lower than that of polymer made from the same monomer under otherwise the same conditions except for the absence of sulfenate. It may also be mentioned that while the sulfenates alone do not initiate thermal polymerization (heat in absence of ultraviolet irradiation), they do aid such thermal polymerization when peroxide catalysts are also present, possibly by releasing S and O free radicals.

Conditions of temperature and pressure at which the photopolymerization is effected can be varied over a wide range. It will be undertsood that optimum conditions will be greatly dependent upon the particular monomeric material being polymerized. Many photopolymerizations are readily effected at temperatures of from 0° C. to 150° C. when the monomer is exposed to a light source rich in ultraviolet light. The present knowledge of the art of photopolymerizations is sufficient to permit choice of suitable operating conditions for any particular monomer, and simple tests can be run if necessary to determine the conditions most suitable for any particular system. At a given temperature, the practice of our invention makes possible a more rapid photopolymerization than is effected in the absence of our added photosensitizers.

Any suitable source of radiation providing wave lengths in the ultraviolet range, preferably within the range of 2,000 to 5,000 Angstrom units and still more preferably within the range of 2,000 to 4,000 Angstroms, can be used. Common sources include mercury lamps and arcs, carbon arcs, and hydrogen discharge tubes. Of course, sunlight also contains substantial amounts of ultraviolet radiation and can be used if desired. Radiation of sufficient intensity from tungsten lamps can be employed. In any event, light within the ultraviolet range of sufficient intensity and for a sufficient time is used to effect the desired extent of polymerization, which can be very small, for example 1 percent of the monomer polymerized but which, for practical reasons, should be considerably larger.

The vessel in which the polymerization is conducted should be transparent to light of the desired wave length so that the light can pass through the sides of the container. Suitable glasses are available commercially, and include borosilicate ("Pyrex"), "Vycor," or soft glass. Alternatively, the source of light can be placed directly over the surface of the monomer in a container, or can be placed within the reaction mixture itself.

While the photopolymerization is usually conducted in mass, i. e., in a system wherein the only components of the reaction mixture are the monomer (or monomers) plus the sulfenate photo-initiator (together with other polymerization initiators and catalysts if desired), the invention is more broadly applicable to all types of polymerization techniques. For example, an added organic solvent for monomer and/or polymer can be present, such as benzene, aliphatic hydrocarbons, ethanol, methanol. Further, the polymerization can be effected by the well-known suspension and emulsion techniques. In the former the monomeric material, preferably already containing the sulfenate compound chosen as photosensitizer, is suspended in the form of small particles in a non-solvent liquid, such as water, an added suspending agent such as starch, carboxymethylcellulose, phosphates, vinyl acetate-maleic anhydride copolymer, or the like, being present to aid in maintaining the particles separate one from another; during the polymerization the particles may tend to grow in size. Emulsion polymerization is similar with the exception that added emulsifying agents are used and the particle size is much smaller so that a stable aqueous emulsion of polymer is the end product of the polymerization. In this instance also it is preferred to dissolve the sulfenate catalyst in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary-alkyl mercaptans. It is generally preferred that free oxygen be absent during the polymerization.

In view of our discovery of the photosensitizing action of organic sulfenates in photopolymerization of a variety of unsaturated organic compounds, it will be apparent that the invention covers broadly the use of any sulfenate effective to accelerate the polymerization of any monomeric material. Those skilled in the art, having had the benefit of the present disclosure, can readily determine by obvious simple tests suitable monomers and sulfenates to be employed. The preferred monomers are acrylonitrile, vinyl acetate, styrene and the lower alkyl acrylates and methacrylates. By the term "lower alkyl acrylates and methacrylates," we include for example methyl, ethyl, isopropyl, n-proply, n-butyl, sec.-butyl, tert.-butyl, and the various amyl and hexyl acrylates and the same methacrylates, in particular. However, other lower alkyl acrylates and methacrylates containing a greater number of carbon atoms, for example up to 8 or 10 carbon atoms, in the alkyl group, fall within the broad scope of the invention.

The monomeric material can be any monomeric material whose photopolymerization is accelerated by a sulfenate. The monomeric material can be a single monomer or a mixture of monomers. Thus, the monomeric material preferably is one of the monomers specifically mentioned hereinabove or a mixture of monomers containing one or more of said monomers specifically mentioned herein above. Thus, the monomeric material can consist of a single monomer, e. g., styrene, or methyl methacrylate, in which case a homopolymer is formed. Or, a copolymer can be formed by subjecting to photopolymerization a mixture of monomers, e. g., styrene plus methyl methacrylate or styrene plus some other ethylenically unsaturated monomer copolymerizable therewith.

The purity of monomer may have a marked effect upon the polymerization rate. Thus, it is ordinarily preferred that the polymerization be effected with freshly distilled monomer, and also in the absence of air. Various sulfenates will differ in the extent to which they are affected by monomer purity, choice of monomer, and conditions of reaction. The invention encompasses the use of those sulfenates effective to photosensitize, i. e., increase the rate of the polymerization, of a given monomeric material of the class described herein under the influence of light in the ultraviolet range with a suitable combination of reaction conditions, including monomer purity and quantity of sulfenate.

The following examples illustrate some preferred aspects of the invention but are not to be taken as exhaustive of the broad scope thereof.

EXAMPLES

Photopolymerization tests were made by sealing under nitrogen in a "Pyrex" glass tube 20 ml. of the chosen monomer, together with about 0.02 gram of the chosen sulfenate. With each monomer a blank was run in which the same quantity of monomer was sealed in the tube without any added sulfenate. The tubes were equally irradiated by a General Electric B–H–4 ultraviolet lamp (a mercury vapor bulb giving light rich in the ultraviolet range) at a distance of 1 to 2 inches, the tubes being held at 40° C. to 45° C. during irradiation. The irradiation time was varied with the different monomers in accordance with previous experience indicating a desirable time for tests of this nature.

After the given polymerization period each tube was opened, the weighed contents precipitated in excess methanol, filtered, washed with methanol, dried, and weighed again to determine the amount of polymer formed, whereby the weight percent of monomer charged that had been converted to polymer was obtained.

The data obtained with various sulfenate photosensitizers and various monomers are given in Table I.

Table I
SULFENATES AS PHOTOSENSITIZERS

| Monomer | AN | | MMA | | VAc | | SM | | MA | |
|---|---|---|---|---|---|---|---|---|---|---|
| Time, hours | 1 | 2 | 3 to 4 | 8 | 16 | 8 | 19 | 17 | 1 | |
| | Conversion to polymer, wt. Percent | | | | | | | | | |
| Sulfenate: | | | | | | | | | | |
| None | 0 | | 4 | 7 | 0 | | 6(d) | 7(g) | 0(i). | |
| 2, 4, 5-Trichlorophenyl trichloromethanesulfenate | 14 | | ca. 50 | | 52 | | 43(e) | | ca. 85(j). | |
| Ethyl trichloromethane-sulfenate | 10 | | ca. 50 | | 15 | | 20(f) | | ca. 85(k). | |
| p-Chlorophenyl p-chlorobenzenesulfenate | | 20(a) | | 47(b) | | 23(c) | | 12(h) | Not tested. | |

AN = Acrylonitrile.
MMA = Methyl methacrylate.
VAc = Vinyl acetate.
SM = Styrene monomer.
MA = Methyl acrylate.

VISCOSITIES OF POLYMERS DESIGNATED BY LETTERS IN BODY OF ABOVE TABLE

| Polymer (0.1% in solvent) | (a) | (b) | (c) | (d) | (e) | (f) | (g) | (h) | (i) | (j) | (k) |
|---|---|---|---|---|---|---|---|---|---|---|---|
| Solvent | DMF | Ac | Ac | Tol | Tol | Tol | Tol | Tol | Ac | Ac | Ac |
| Viscosity, $n_{sp}$ | 0.53 | 0.15 | 0.09 | 0.25 | 0.03 | 0.09 | 0.16 | 0.08 | *1.49 | 0.31 | 0.52 |

DMF = Dimethylformamide.
Ac = Acetone.
Tol = Toluene.
*Polymer obtained after 6 hours.

While the invention has been described with particular reference to various preferred embodiments thereof, it will be appreciated that numerous modifications and variations are possible without departing from the invention.

We claim:

1. In the photopolymerization of an ethylenically unsaturated monomer, the improvement which comprises employing a small amount of a compound, effective to photosensitize said polymerization, having the formula $$R\text{—}O\text{—}S\text{—}R'$$

wherein R and R' are organic radicals each of which is attached to the —O—S— group through a carbon atom.

2. In the photopolymerization of an ethylenically unsaturated monomer, the improvement which comprises employing as a photopolymerization accelerator a small amount of para-chlorophenyl parachlorobenzenesulfenate effective to photosensitize said polymerization.

3. In the photopolymerization of an ethylenically unsaturated monomer, the improvement which comprises employing as a photopolymerization accelerator a small amount of 2,4,5-trichlorophenyl trichloromethanesulfenate effective to photosensitize said polymerization.

4. In the photopolymerization of an ethylenically unsaturated monomer, the improvement which comprises employing as a photopolymerization accelerator a small amount of ethyl trichloromethanesulfenate effective to photosensitize said polymerization.

5. In the photopolymerization of an ethylenically unsaturated monomer, the improvement which comprises employing as a photopolymerization accelerator a small amount of p-methylphenyl p-methylbenzenesulfenate effective to photosensitize said polymerization.

6. A process which comprises polymerizing under the influence of light in the ultraviolet range a monomer selected from the group consisting of acrylonitrile, vinyl acetate, styrene, and the lower alkyl acrylates and methacrylates, in the presence of a small amount of a compound, effective to photo-sensitize said polymerization, having the formula $$R\text{—}O\text{—}S\text{—}R'$$

wherein R and R' are organic radicals each of which is attached to the —O—S— group through a carbon atom.

7. A process according to claim 6 wherein said compound is employed in an amount within the range of from 0.01 to 1.0 weight percent of the monomer.

8. A process according to claim 6 wherein at least one of R and R' is an aryl radical.

9. A process according to claim 6 wherein said monomer is acrylonitrile.

10. A process according to claim 6 wherein said monomer is vinyl acetate.

11. A process according to claim 6 wherein said monomer is styrene.

12. A process according to claim 6 wherein said monomer is methyl methacrylate.

13. A process according to claim 6 wherein said monomer is methyl acrylate.

14. A process according to claim 1 wherein at least one of R and R' is an aryl radical.

15. A process according to claim 1 wherein both R and R' are aryl radicals.

16. A process according to claim 1 wherein both R and R' are selected from the group consisting of hydrocarbon and chlorinated hydrocarbon radicals.

17. A process according to claim 1 wherein both R and R' are hydrocarbon radicals.

References Cited in the file of this patent

UNITED STATES PATENTS 2,460,105   Richards _____ Jan. 25, 1949